Figure 1:
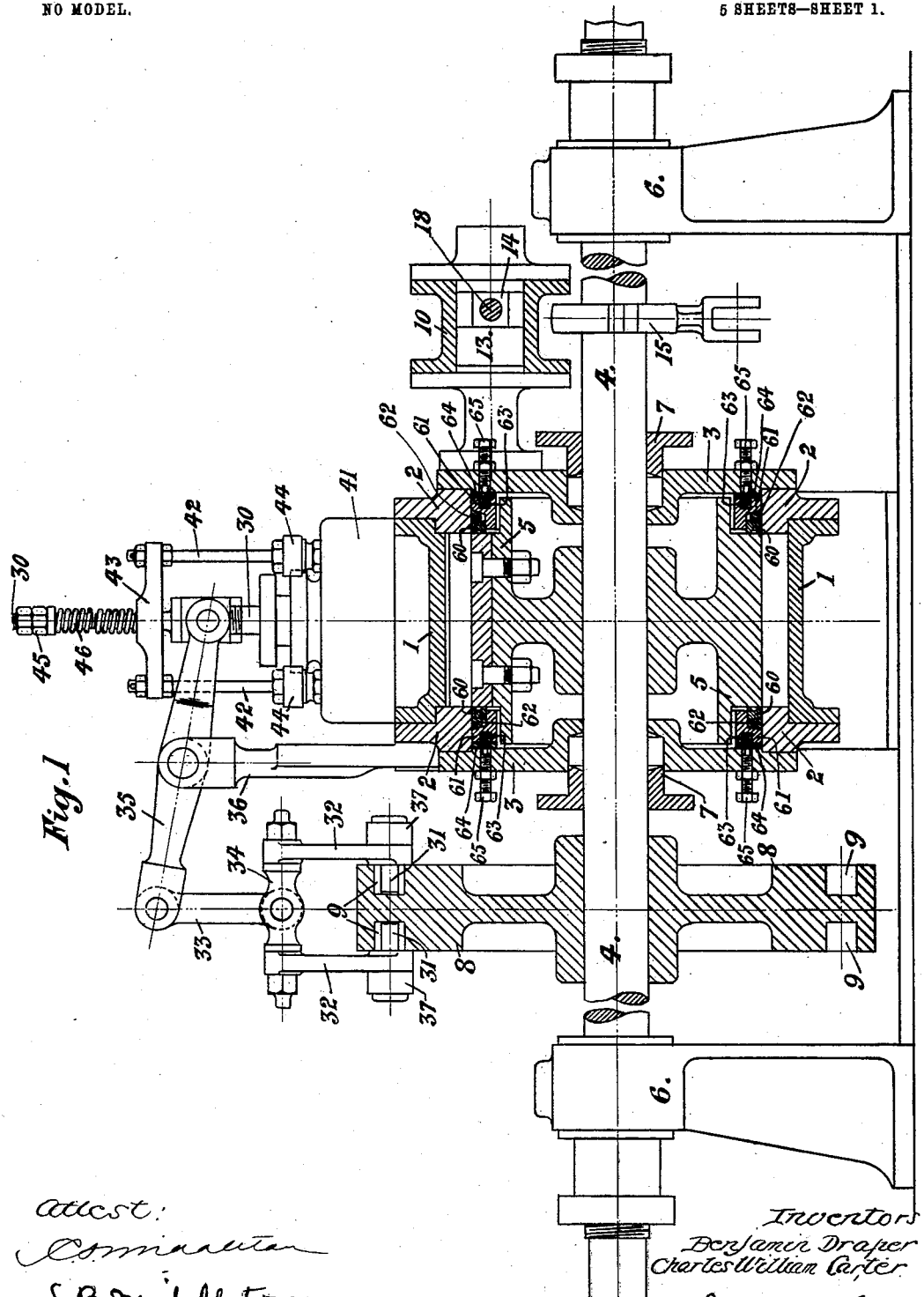

No. 732,280. PATENTED JUNE 30, 1903.
B. DRAPER & C. W. CARTER.
ROTARY FLUID PRESSURE ENGINE.
APPLICATION FILED APR. 4, 1902.

NO MODEL. 5 SHEETS—SHEET 1.

Attest:
C. Mmaartan
L. B. Middleton

Inventors
Benjamin Draper
Charles William Carter
By Richards & Co
Attys.

No. 732,280. PATENTED JUNE 30, 1903.
B. DRAPER & C. W. CARTER.
ROTARY FLUID PRESSURE ENGINE.
APPLICATION FILED APR. 4, 1902.
NO MODEL. 5 SHEETS—SHEET 3.

No. 732,280. PATENTED JUNE 30, 1903.
B. DRAPER & C. W. CARTER.
ROTARY FLUID PRESSURE ENGINE.
APPLICATION FILED APR. 4, 1902.

NO MODEL. 5 SHEETS—SHEET 4.

Attest:
O. S. Middleton
L. B. Middleton

Inventors.
Benjamin Draper.
Charles William Carter,
by Richards & Co
attys

No. 732,280. PATENTED JUNE 30, 1903.
B. DRAPER & C. W. CARTER.
ROTARY FLUID PRESSURE ENGINE.
APPLICATION FILED APR. 4, 1902.
NO MODEL. 5 SHEETS—SHEET 5.
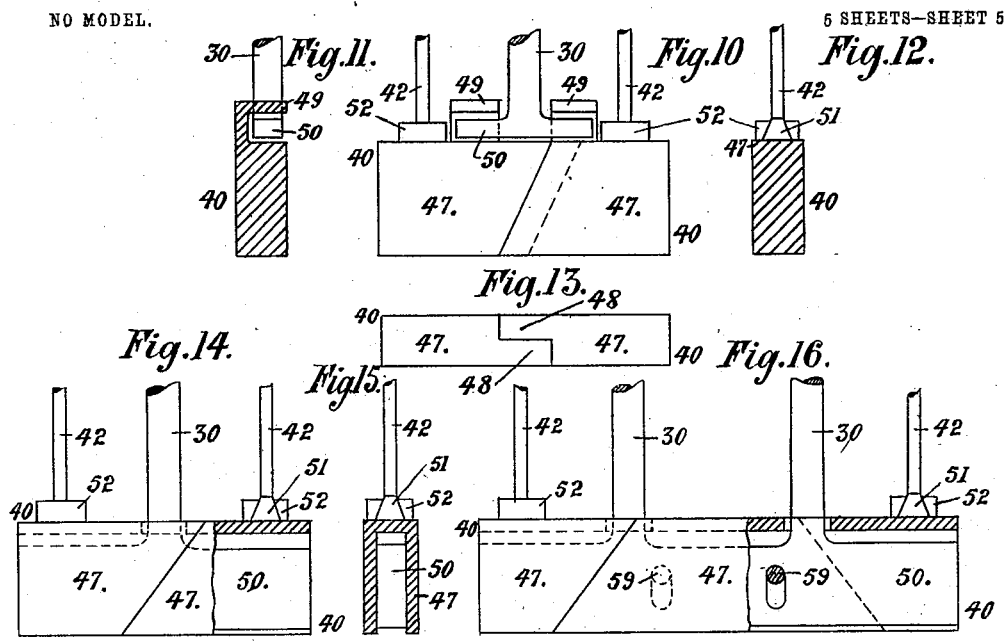
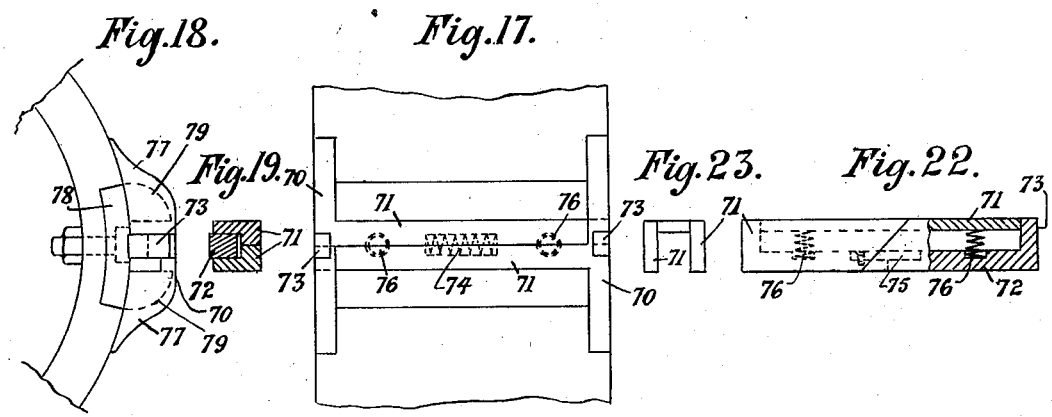
Inventors,
Benjamin Draper.
Charles William Carter.
Attest:
L. B. Middleton
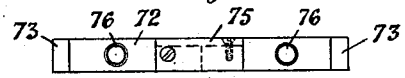
By Richards & Co
Attys.

No. 732,280. Patented June 30, 1903.

UNITED STATES PATENT OFFICE.

BENJAMIN DRAPER AND CHARLES W. CARTER, OF LIVERPOOL, ENGLAND.

ROTARY FLUID-PRESSURE ENGINE.

SPECIFICATION forming part of Letters Patent No. 732,280, dated June 30, 1903.

Application filed April 4, 1902. Serial No. 101,395. (No model.)

*To all whom it may concern:*

Be it known that we, BENJAMIN DRAPER and CHARLES W. CARTER, subjects of the King of England, and residents of Liverpool, in the county of Lancaster, England, have invented new and useful Improvements in or Connected with Rotary Fluid-Pressure Engines or Pumps, of which the following is a specification.

This invention has reference more particularly to engines or motors worked by fluids, and more especially gaseous or vapor fluids; but it also has reference to pumps or apparatus for forcing fluids; but for convenience it will be described mainly as applied as a motor or engine.

The chief object of this invention has been to provide improvements in connection with rotary engines by which, while their efficiency is good, the construction and arrangement of parts and mode of action are such that their durability in an efficient condition is great, while they are simple in form, cheap in construction, and can be readily overhauled and repaired when necessary.

According to this invention the cylinder in which the pressure-fluid operates is annular, the annulus being formed by the outer cylindrical case and two end plates thereon and by a barrel carrying or containing on its periphery the piston. This barrel is mounted concentrically within the cylinder—that is, is on the same axis as the cylinder—and revolves, and the piston sweeps in its operation through the cylinder annulus in a circular path. The medium which affords the resistance to or reaction for the fluid, to enable it to act as required and upon the piston, consists of a gate-valve adapted to move toward and away from the barrel and to make a steam-tight joint therewith and with the side and ends of the cylinder itself, and steam or motor fluid is admitted to the cylinder on one or other side of this gate, according to the direction of revolution of the piston. When the piston moves into the neighborhood of the gate-valve in each revolution, the gate-valve is moved by means, as hereinafter described, away from the piston-barrel and out of the cylinder annulus, and when the piston has passed the path in which the gate moves the gate is again moved down onto the barrel and forms the septum in the cylinder.

The invention will be further described with reference to the accompanying drawings.

Figure 2:
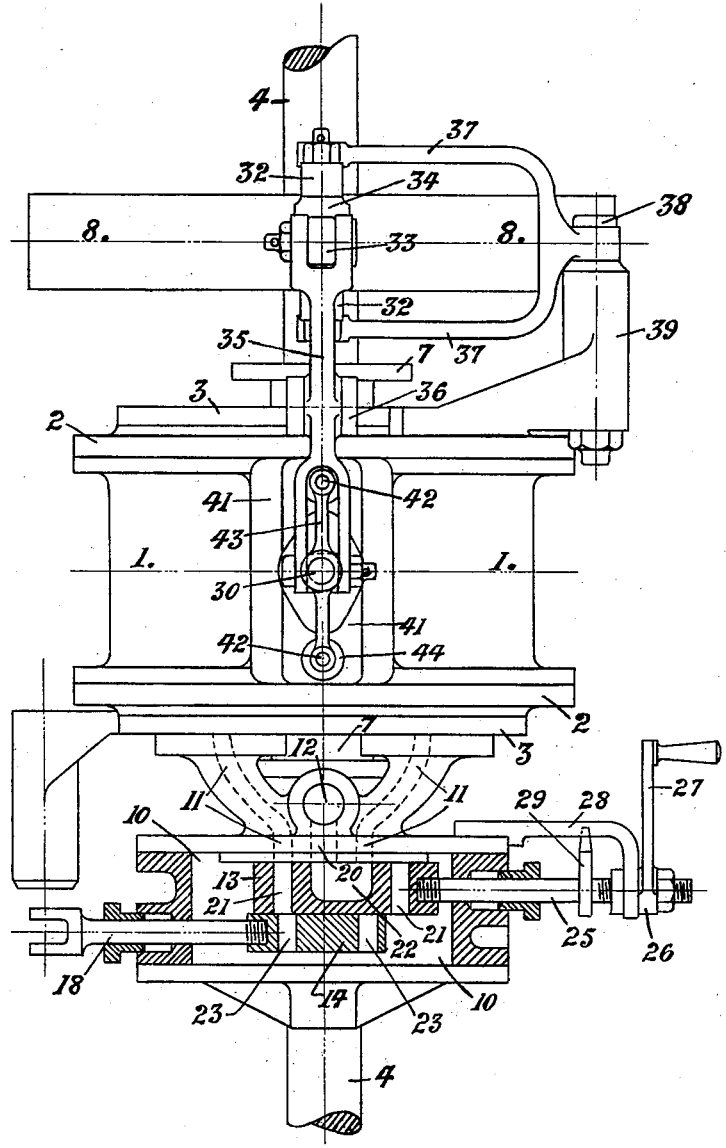
Figure 3:
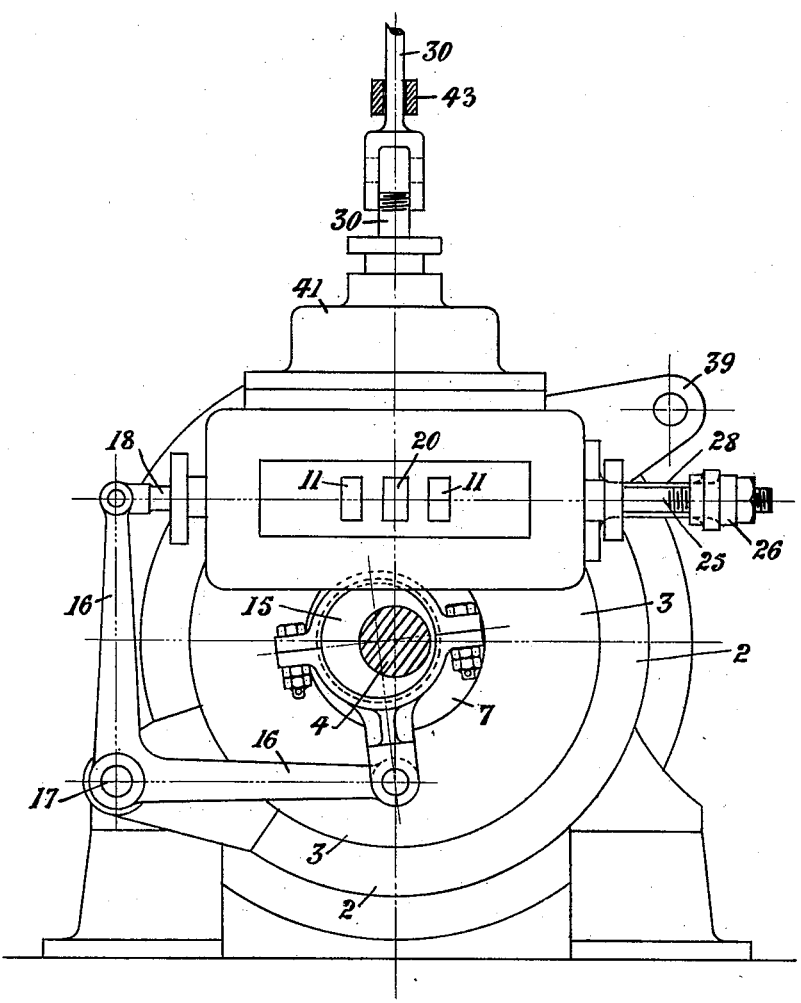
Figure 4:
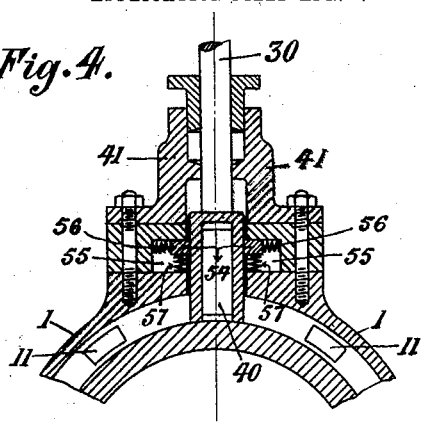
Figure 5:
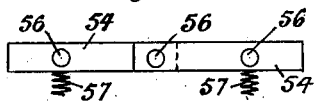
Figure 6:
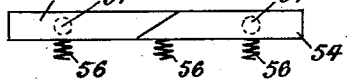
Figure 7:
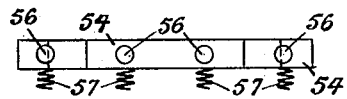
Figure 8:
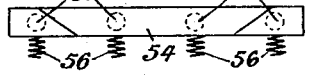
Figure 9:
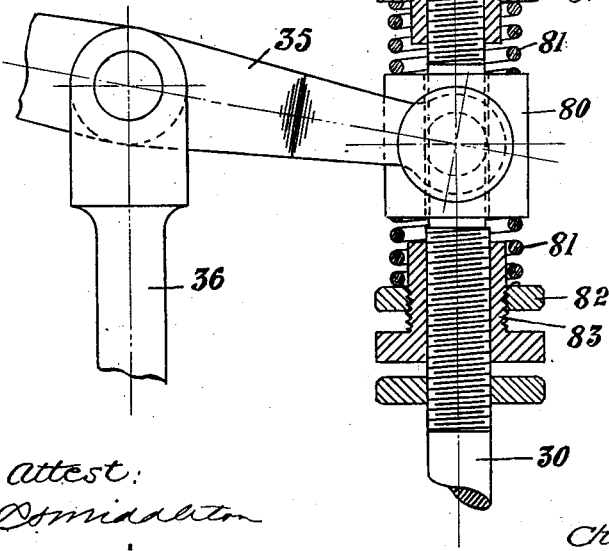

In the drawings, Figure 1 is a longitudinal elevation in section, showing the engine. Fig. 2 is a plan of the engine, partly in section; and Fig. 3 is an end view. Fig. 4 is a cross-section through the upper part of the engine, showing the movable gate and its case and packing. Figs. 5 and 6 are face view and plan of packing-bars used in connection with same, while Figs. 7 and 8 show a modified form of this packing-bar in face and plan view. Fig. 9 is a detail showing a modified construction of a part of the mechanism for actuating the gate. Fig. 10 is a side elevation, Fig. 11 a cross-section, Fig. 12 an end view, and Fig. 13 a plan in section, showing a construction of gate according to the invention. Fig. 14 is a side elevation, and Fig. 15 an end view, showing a modified form of gate, while Fig. 16 shows a still further modified construction of gate. Fig. 17 is a plan showing the piston. Fig. 18 is an end view of same, and Fig. 19 shows the piston in cross-section. Fig. 20 shows a part of the packing illustrated in Figs. 18 and 19 in side elevation, and Fig. 21 shows this packing viewed from above. Figs. 22 and 23 are detail views of a modified form of piston.

Referring to the drawings, 1 is the cylinder of the engine.

2 represents the end plates or covers inclosing the annular space in which the piston works at the ends.

3 represents inclosing-plates fixed on the covers 2.

4 is the shaft of the engine.

5 is the piston-barrel, fixed on the shaft 4 and carrying on its periphery the piston.

6 represents bearings supporting the shaft 4.

7 represents the glands and stuffing-boxes in the ends of the plates 3 for making the inclosed space in which the barrel 5 works tight.

8 is a fly-wheel having grooves 9, forming cam-grooves for operating the gate, as hereinafter described.

10 is the valve-box, in which the steam-distribution and governing valves are disposed.

11 represents steam-ports leading between the valve-box 10 and the interior of the cylinder on either side of the gate, while 12 is the exhaust-pipe communicating with the exhaust-passage in the valve-casing.

13 is a reversing-valve working in the case 10 for regulating the direction of motion of the engine and supplying steam to one or other side of the gate and exhausting it, while 14 is a cut-off valve which works on the back of the valve 13, its operation being effected by an eccentric 15 on the shaft 4, a bell-crank lever 16, fulcrumed at 17, and a valve-rod 18.

The face of the valve-box 10, in which the valve 13 slides, is shown in Fig. 3, illustrating the two outer ports 11 and the central exhaust-port 20. The valve 13 has two steam-ports 21, extending through it from one face to the other, and an exhaust-port 22 in the form of a chamber for making communication between one of the ports 11 and the exhaust-port 20, while the valve 14 has two ports 23, which operate in connection with the ports 21. The valve 13 is operated by a spindle 25, the outer end of which is threaded and works in the internal threaded nut 26 on the handle 27, by the rotation of which the valve and its spindle would be worked longitudinally, the spindle being guided by the bracket 28. 29 is a pointer on this spindle to indicate the position of the valve in relation to the cylinder-ports. By revolving the handle 27 the port 22 will be set to exhaust the engine through one or other of the ports 11, while steam will be admitted through one of the ports 21. When the valve 13 is set and the engine started, the valve 14 will be operated to and fro on the back of valve 13, supplying steam to the engine through one of its ports 23, one of the ports 21 of the valve 13, and one of the ports 11, while its other port 23 will be inoperative, and to regulate the point of cut-off the valve 13 will be moved longitudinally and adjusted so that its port 21 will be covered and closed by the valve 14 earlier or later in the stroke or revolution of the engine-piston, as may be required.

The movable gate (which is illustrated in Figs. 4 to 16 and is hereinafter described) is operated by the cam-grooves 9 of the wheel 8, motion being transmitted from the grooves to the main spindle 30 for operating the gate through roller-wheels 31, disposed and working in said grooves and supported on the ends of the links 32, the link 33, connected to a cross-bar 34, connecting the upper ends of the links 32 together, and a lever 35, supported on the bracket 36 (on which it is fulcrumed) and connected at one end with the link 33 and the other with the rod 30. The lower ends of the links 32 are supported by the bifurcated link 37, hinged at 38 to a bracket 39, the ends of links 32 being secured to the end of the link 37.

With regard to the gate, the casing in which it slides or works, and its operating-gear the gate is generally designated 40, while the case in which it works is 41, and in addition to the main rod 30 for working it there are two other rods 42, these two rods 42 being coupled together by a cross-bar 43 and passed into the casing 41 through stuffing-boxes 44, while the rod 30 is extended up above the end of its operating-lever 35 and passes through the cross-bar 43, and between this cross-bar 43 and nuts 45 on the end of the rod 30 there is a spring 46, which normally presses the bar 43 and rods 42 downward.

The gate 40 is composed of a plurality of parts, and the rod 30 operates in connection with these two parts mainly in the lifting action, while the rods 42 operate them in the closing action of the gate, as hereinafter described.

In the modified construction shown in Figs. 10 to 13 the gate consists of two parts 47, the inner adjacent ends of which are inclined and overlap at 48 and are adapted to slide on one another and make a steam-tight joint with each other. On the upper part of each of these parts 47 there is a socket-piece 49, within which the T-shaped head 50 of the rod 30 fits and by means of which these parts 47 are operated. The ends 51 of the rods 42 are tapered outwardly in dovetailed form and fit in inwardly-projecting parts 52 on the upper edges of the gate parts 47. These parts 52 are disposed longitudinally on the gate so as to enable the parts 47 to move longitudinally in relation to the rods 42. The upper surface of the head 50 of the rod 30 is so disposed in relation to the under surface of the sockets 49, with which it is adapted to engage, that the one part 47 on the left-hand side will be lifted slightly before the other part 47. By this construction the outer ends of the gate parts can move inward slightly when the gate is being raised by the rod 30, so that in the raising action the pressure of the ends on the cylinder-covers and gate-case will be eased and there will be little or no friction in the movement, while when the gate is moved down the parts 47 are pressed on by the rods 42 through the spring 46 and cross-head 43, and by the inclined joint 48 they are pressed and caused to move or adjust themselves outward up against the edges of the cylinder-covers 2 and the gate-chest 41.

The sides of the gate 40 are made steam-tight with the sides of the chest 41, in which it works, by packings 54, held in the cavities 55 in the lower part of the case 41, this lower part being separate from the upper part of the case. This packing 54 is pressed toward the gate 40 by springs 56 and against the roof of the cavity 55 by springs 57. For a reversing-engine this packing-bar 54 would be required on both sides of the gate, but for an engine working only in one direction it will be only required on one side of the gate, and it is on the same side as that on which the steam-pressure will exist.

The action of the gate is that it is raised by its operating-gear prior to its being reached by the piston in its rotation, and directly the piston has passed under it it is lowered and fills and closes the annular space through which the piston sweeps, making a steam-tight joint with the periphery of the barrel 5, the end covers 2, and the ends of the chest 41 and the packing 54 in the sides of this chest.

In the modification of gate shown in Figs. 14, 15, and 16 the head 50 of the rod 30 is disposed inside the parts 47 and the upper edge of this head on one side—viz., on the left-hand side in the construction shown—is closer to the inside of the top of the part 47 on that side than the right-hand end is to the other part, so that when the rod 30 is lifted the left-hand part 47 is lifted slightly before the other part, and so diminishes the end friction on the cylinder-covers 2, as in the former case.

The modification of gate shown in Figs. 14, 15, and 16 is one adapted for long gates. In this case there are three parts 47, while there are two lifting-rods 30, these rods being attached to a common head 50. The center-packing part 47 is allowed to drop slightly lower than the end piece 47, and these end pieces are lifted before the middle part by the head 50, so as to diminish or ease the friction upon the ends, as above described, in the lifting action of the gate, while in the closing action the outer end parts 47 are pressed down by their rods 42, and in so doing they will be pressed longitudinally by the inclined jointed ends 48 of the center part. The center packing-piece 47 is guided in relation to the head 50 by pins 59, working in slots in the head 49.

With regard to the modified construction connected with the rod 30 for operating the gate (shown in Fig. 9) the lever 35 is connected with and operates a block 80, adapted to slide freely on the rod 30, and the movement of this block is transmitted to the rod 30 in either direction through springs 81, such springs being in contact with the block 80 at one end and supported at the other on nuts 82, screwed onto the sleeves 83, which are in turn screwed onto threaded portions of the rod 30. The springs 81 serve as buffers to the block 80, while when such block has moved a certain distance and compressed the springs to a certain amount the ends of the sleeves 83 next the block are acted upon by it.

A steam-tight joint is made at the angle at the inner edges of the piston-barrel 5 and the covers 2 by a packing consisting of an inner metal ring 60, an outer metal angle-ring 61, the inner flange of which lies within the ring 60, and the ring 62, of woodite or other suitable soft material, disposed between the outer edge or back of the ring 60 and the angle or flanged ring 61. The soft-material ring 62 is made slightly wedge-shaped, as are the surfaces which bear upon it of the rings 60 and 61, and it makes a steam-tight joint with the inner edge of the annular covers 2 by the pressure exerted inward on the packing, while the inner face of ring 60 makes a steam-tight joint with the edge of the barrel 5. The whole ring 61 and with it the rings 60 and 62 are pressed by springs 63, fitting in holes in the ring 61 and resting at their outer ends on a ring 64, which is pressed up or adjusted by the adjusting-studs 65, screwing through the cylinder-cover plates 3.

With regard to the piston shown in detail in Figs. 17 to 21, this is made mainly in two parts or halves, comprising an end part 70, which works against the end covers 2, and a bar 71, formed in 70 and projecting inward therefrom and lying side by side and filling the space between these two parts 70, and the end of each part 71 projects into a space in these end parts 70. Further, the end parts 70 and the intervening parts 71 are formed with a groove adapted to receive and hold a packing-strip 72, having an upwardly-projecting part 73 on each side which fits in a corresponding recess in the ends 70. The two parts 70 71 are pressed apart by a spring 74 in the center of same, so as to press these parts against the end covers 2 and make a steam-tight joint therewith, and by means of the projecting parts 73 of the bar 72 the ends of this bar are also pressed up against the covers 2.

The packing-piece 72 is in two parts to allow of longitudinal valve movement in the opposite ends or parts. The meeting ends of these two parts are provided with a strip 75 on the top and also on one side, so as to prevent steam passing this strip when these two parts move longitudinally in relation to one another.

Springs 76 are provided between the parts 72 and the bars 71, so as to press the bar 72 onto the barrel 5 and the bars and ends 70 71 onto the walls of the cylinder 1. The parts 70 are carried out at 77 in the form of inclines, so that should in case of accident the gate 40 not be moved out of the way of the piston by its operating gear it would be moved up into its casing 41 by these inclines 77.

The piston shown in Figs. 17 to 21 is supported on the barrel 5 by a shoe 78, bolted on the barrel and having two projecting lugs or parts 79, within which the parts 71 of the piston rest.

A modified form of piston is shown in Figs. 22 and 23. This consists of two parts 71, movable longitudinally and having overlapping meeting edges. These two parts have a space extending through them longitudinally, in which fits the packing-bar 72, similarly to the packing-bar shown in Figs. 17 to 21, and this bar has raised ends 73, fitting in recesses in the ends of the parts 71, and springs 76 are introduced between the parts 71 and 72 and press 71 up to the cylinder-surface and the part 72 onto the bottom of the shoe 78, in which these parts would be disposed and carried.

Having now described our invention, what we claim as new, and desire to secure by Letters Patent, is—

1. In a rotary fluid-pressure engine or pump, the combination of a stationary cylinder; a barrel adapted to revolve in said cylinder about an axis coincident with the cylinder-axis; annular end covers on said cylinder, the inner faces of which are substantially the same diameter as the barrel; a piston mounted on said barrel, and revolving therewith; and a packing disposed at the ends of the barrel and within the annular end cover of the cylinder, and adapted to press and make a steam-tight joint with the barrel edges and the inside of the covers; and comprising an outer annular ring, an inner ring adapted to bear on the barrel edge, and a ring on the periphery between said main ring and inner ring, adapted to bear on the inner surface of the end covers, and springs adapted to press said outer main ring toward the barrel; substantially as set forth.

2. In a rotary fluid-pressure engine or pump, the combination with the stationary cylinder 1, and rotary barrel 5, of the gate 40 comprised of a plurality of parts; the case 41 in which said gate moves; a rod 30 extending through said case 41 for lifting said gate; rods 42 extending through said case and connected with the gate for pressing said gate down; a spring 46 adapted to press said rods inward; and means connected with said rod 30 for operating it; substantially as set forth.

3. In a rotary fluid-pressure engine or pump, the combination with the stationary cylinder 1, and rotary barrel 5, of the piston mounted on said barrel, and comprising bars 71, end pieces 70, and packing-rings 72, and springs 74 and 76 for pressing said parts 70 and 71 longitudinally, and parts 72 and 71 radially away from one another; substantially as set forth.

4. In a rotary fluid-pressure engine or pump, the combination of the stationary cylinder 1; end annular covers 2; rotary barrel 5, radially-movable gate 40; a gate-case 41 and packing-rings forming a fluid-tight joint between the edge of the barrel 5, and the end annular covers 2; as set forth.

5. In a rotary fluid-pressure engine, the combination of the stationary cylinder 1; end annular covers 2; rotary barrel 5; radially-movable gate 40; a gate-case 41; a valve-box 10; a reciprocating fluid-distribution valve 14; fluid-ports 11 communicating between the port face of the box and the opposite sides of the gate in the cylinder; and the reversing valve 13 between valve 14 and the port face of the valve-box; as set forth.

6. In a rotary fluid-pressure engine, the combination of the stationary cylinder 1; end annular covers 2; rotary barrel 5; radially-movable gate 40; a gate-case 41; a rod 30 connected with said gate; rods 42 also connected with said gate; cross-bar 43 connecting said rods 42, and through which said rod 30 extends; and a spring 46 on said rod 30 above the bar 43, and adapted to press on same, said upper part of the rod 30 being adapted to move up and down through the bar 43; substantially as set forth.

In witness whereof we have hereunto set our hands in presence of two witnesses.

BENJAMIN DRAPER.
CHAS. W. CARTER.

Witnesses:
SAM GOODALL,
LEONARD STAWLEY.